United States Patent [19]
Dudek

[11] 3,869,113
[45] Mar. 4, 1975

[54] HIGH LOAD BUSHING
[75] Inventor: Thomas J. Dudek, Tallmadge, Ohio
[73] Assignee: The General Tire & Rubber Company, Akron, Ohio
[22] Filed: July 16, 1973
[21] Appl. No.: 379,666

[52] U.S. Cl.............................. 267/57.1 R, 308/26
[51] Int. Cl.............................................. F16f 1/16
[58] Field of Search........... 267/63 R, 63 A, 57.1 R, 267/57.1 A; 308/26, 237 R

[56] References Cited
UNITED STATES PATENTS
3,400,937   9/1968   Crankshaw.......................... 308/26
3,690,639   9/1972   Brandon et al..................... 267/57.1

*Primary Examiner*—James B. Marbert
*Attorney, Agent, or Firm*—James M. Peppers

[57] ABSTRACT

A high load bushing which comprises an outer rigid member and an inner rigid member spaced apart from the outer member. Compressively positioned between and bonded to the inner and outer members is an elastomeric-fabric composite convolution. The composite is preferably a parallel array of cords, such as tire cords, coated on both sides with an elastomer such as rubber in a calendering process so as to embed the cords in a rubber matrix which is spirally wound to provide the composite convolution

23 Claims, 6 Drawing Figures

HIGH LOAD BUSHING

FIELD OF THE INVENTION

The present invention relates to a high load elastomeric bushing comprising an inner and outer rigid member between which is positioned an elastomeric insert, and, in particular, to a bushing having positioned between and bonded to said members, an elastomeric-fabric composite convolution.

BACKGROUND OF THE INVENTION

In the isolation of vibration between structural components, it has become well known to use an elastomeric member which is inserted between a pair of concentric rigid sleeves in which the inner sleeve is secured to one structural component and the outer sleeve is secured to the other structural component. These bushings are also utilized to increase the damping of metal structures such as metal frames of automobiles and to interrupt the low impedance all-metal path for the transmission of structural-borne sounds in a structure. Originally these bushings were made by inserting the uncured elastomeric insert between the sleeves and thereafter relieving the internal stresses of the insert during bonding and cure. To increase the load bearing capacities of the bushings, pre-cured inserts were compressively inserted between the sleeves. It was also found that various spring rates in different radial directions could be achieved in a single bushing by providing the insert with opposing recesses.

To increase the load bearing capacities or radial spring rates, it has been known to reduce the radial wall thickness of the insert to keep the strain levels below fatigue endurance limit levels. However, such a reduction also correspondingly increases the torsional and axial spring rates so that this solution was not always practical. Accordingly, the use of multi-inserts was employed to achieve high load bearing capabilities without substantially changing or increasing the torsional spring rates. While this approach has been generally successful in achieving the sought for spring ratings, it greatly limits the number of design parameters available as well as creates production problems.

The present invention provides a bushing capable of meeting high bearing load requirements without compromising torsional and/or axial spring rate requirements. Furthermore, greater control over design parameters is possible which generally results in smaller parts without creating production difficulties. Accordingly, the bushing of the present invention overcomes the limitations and disadvantages inherent with high bearing load bushings of the prior art. The invention also provides a means for controlling the damping of bushing assemblies which is unknown in the prior art.

SUMMARY OF THE INVENTION

The elastomeric bushings of the present invention comprise a rigid outer member, a rigid inner member spaced apart from the outer sleeve, and an elastomer-fabric composite convolution positioned between and bonded to the inner and outer members. Preferably, the inner rigid member or sleeve is spirally wound with a calendered rubber fabric or a calendered fabric laminated with a thin sheet of rubber or elastomeric material. Suitable fabrics include cotton, rayon, nylon, polyester, glass and other textile fabrics as well as steel or carbon fabrics. Elastomeric materials in addition to natural rubber are synthetic elastomers such as styrene-butadiene rubber, ethylene-propylene rubber, and the like. Particularly well suited for the present invention are calendered fabrics presently used for construction of tire carcasses; that is, the standard tire ply material comprising a parallel array of cords embedded in a rubber matrix.

In the fabrication of the elastomeric bushings of the present invention, inserts consisting of the inner member or sleeve spirally wound with the elastomer-fabric composites are preferably made to a length substantially equal to the width of calendered fabric. Once wound, the insert is cut to the desired length of the bushing. This method facilitates production of the bushing as well as reduces assembly time. Alternatively, the calendered fabric could be cut to the desired bushing size and then wound upon the inner sleeve. This process, however, entails additional processing steps and is, therefore, not preferred.

The elastomer-fabric composite can be wound so as to orient the fabric or cord in a direction circumferentially about the inner sleeve, axially or in a biased direction. The orientation of the cord relative to the axis of the sleeves as well as its thickness, the nature and characteristics of the elastomer, and the number of spiral windings (thickness of the convolution) are used to control the various spring rate parameters. For example, forming a convolution wherein the fabric or cord is circumferentially oriented with respect to the inner sleeve, relatively low radial spring rates can be achieved together with a relatively low torsional rate. Axial orientation of the cord, on the other hand, provides higher radial spring rates with relatively low torsional rates. A bias orientation provides a compromise between high radial and torsional spring rates as well as significantly increasing the damping in the bushing. Also, by increasing the amount of elastomeric laminate or calendered elastomer, a softer spring rate can be achieved in both radial and rotational directions.

After the convolution of laminate is formed, the composite is preferably forced into compression between the inner metal sleeve and the outer metal sleeve in its uncured state by methods similar to those presently employed in the production of bushings having an elastomeric insert between rigid inner and outer members. Because of the relatively high stiffness of the fabric or cords, high elongation of the insert is not possible. For example, elongation of about 20 percent is not uncommon. After assembly, the bushing is cured into an integral unit within a curing or bonding oven, and the pre-compression and thermal expansion of the rubber is used to maintain the elastomer in a state of compression during the curing step. Because of the preferable concentric cylindrical construction of the bushing, rapid dielectric curing methods are suitable.

Alternatively, the wound elastomeric insert can be precured into an integral unit within a mold or autoclave. The precured insert they may be placed into an outer metal sleeve in accordance with commonly known techniques. The assembled bushing is then placed in a bonding furnace where, during final vulcanization, the insert is bonded to the outer and inner metal sleeves.

Other advantages of the present invention will become apparent from a perusal of the following detailed description of a presently preferred embodiment taken in connection with the accompanying drawings.

PRESENTLY PREFERRED EMBODIMENT

Figure 1:
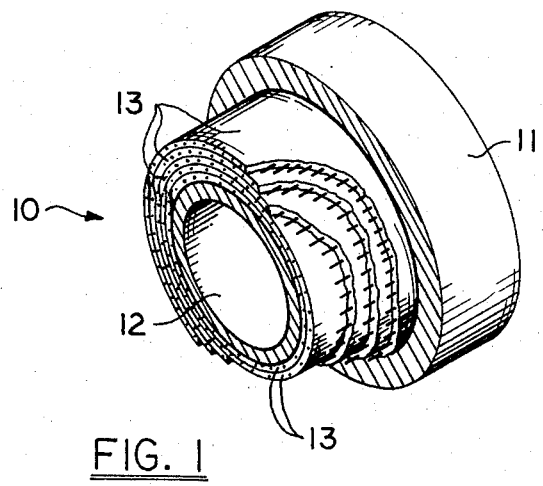
FIG. 1 is an isometric view, in partial section, of a bushing having an elastomeric-fabric composite convolution with axially oriented cords.
Figures 2, 2A:
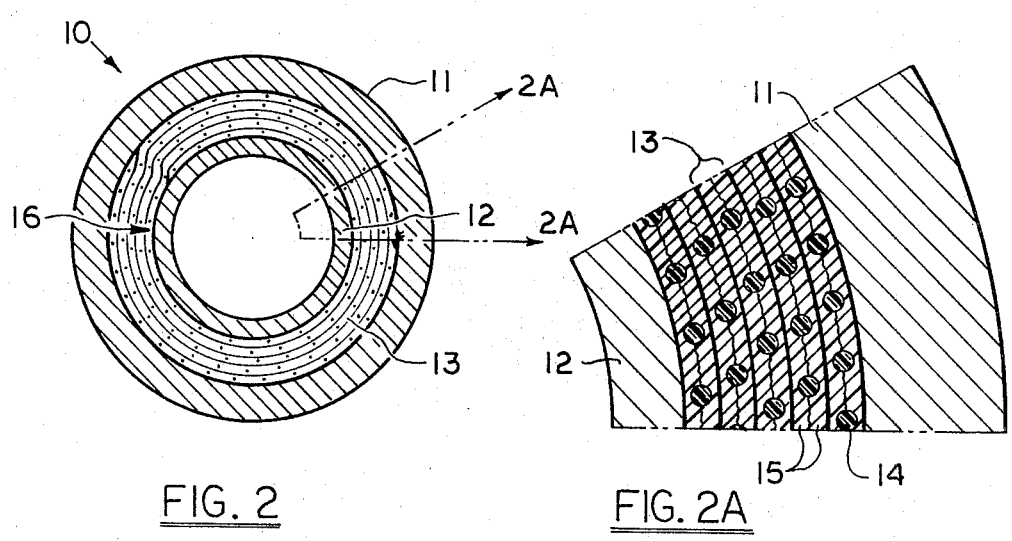
FIG. 2 is an elevation in partial section of the bushing shown in FIG. 1.
FIG. 2A is an enlarged section taken between lines 2A and 2A of FIG. 2.

Referring to FIGS. 1 and 2, an elastomeric bushing 10 is shown. Bushing 10 comprises an outer rigid member 11 and a spaced apart inner rigid member 12. Preferably, members or sleeves 11 and 12 are made of steel or a like rigid material and concentrically spaced apart. Inner metal sleeve 12 is provided with a calendered elastomer-fabric composite 13 wound about its outer surface to form convolution 16. The number of spiral windings of convolution 16 depends upon the desired spring characteristics. For example, a convolution consisting of five spiral windings of circumferentially oriented rubber coated fabric has been found to produce a bushing having the torsional qualities as well as dimensional measurements of presently known bushings while providing a bushing having increased load characteristics and substantially increased service life.

Figures 3A, 3B, 3C:
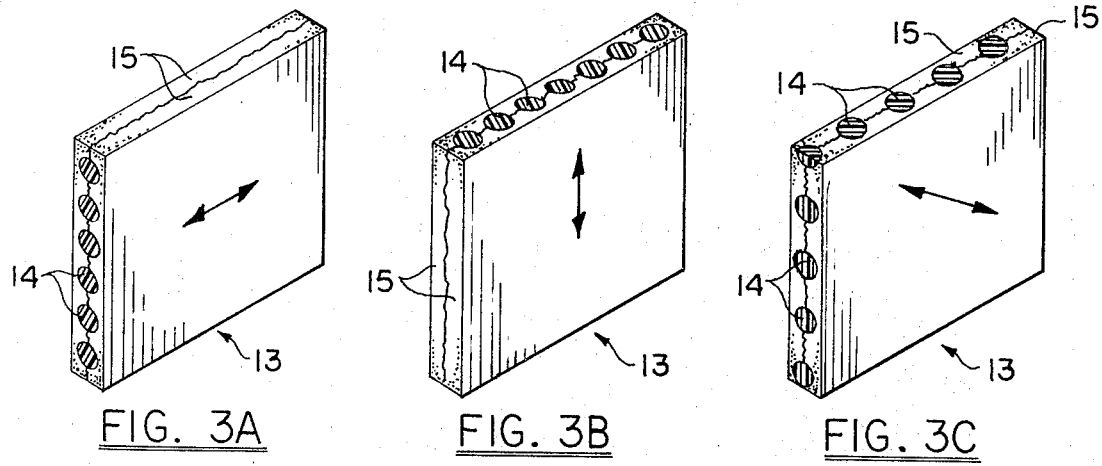
FIGS. 3A, B and C are enlarged views of laminate samples showing circumferentially oriented cord fabric, axially oriented cord fabric, and a biased cord fabric, respectively.

Material 13 is a fiber/rubber composite material in sheet form. Preferably, the composite material 13 is tire cord fabric, which is well known for use in the construction of tire carcasses. This material is a cord/rubber laminated composite consisting of tire cords arranged in a parallel array which have been coated on both sides with rubber in a calendering process to provide an array of cords embedded in a rubber matrix. Typically, the number of cords varies from about 16 to 35 cords per inch (ends per inch) and the distance between the cords can be varied from 0.004 inch to 0.030 inch depending on cord diameter, cord structure, and type. Typical thicknesses for coated fabrics are in the range of about 0.030 inch to 0.075 inch. Alternatively, a laminate 13 may be used as shown in FIG. 3 (after calendering) comprising a layer of cord fabric 14 positioned between elastomeric layers 15. Elastomeric material 15 preferably has a durometer of between about 40 and 60 Shore A, after calendering. Cord fabric 14 can be oriented within the laminate for cirferential positioning, FIG. 3A, on sleeve 12, axial positioning, FIG. 3B, or for bias positioning, FIG. 3C. Alternatively, a bias ply laminate comprising two layers of cord/rubber fabric material wherein the cord direction is oriented at a positive rotational angle in one layer and at a negative rotational angle in the other layer.

The thickness of elastomer 15 and fabric cord 14 are variable and depend upon the particular characteristics desired. For example, an elastomeric composite 13 was prepared by laminating a polyester-calendered fabric 14 having a ply thickness of 50 mils and cord count of 23 ends/inch, with an elastomeric sheet of a natural rubber compound having a durometer between 40 and 45 and having a thickness of 50 mils. The polyester cord construction had a denier of 1,300 and two plies of yarn per cord comprising an 0.028 inch diameter cord. The composite laminate 13 was wrapped five times around sleeve 12 which had an outer diameter of 0.406 inches. Polyester cords 14 of laminate 13 were oriented in the circumferential direction about sleeve 12. The inserted laminate 13 had a radial thickness of about 0.41 inches and was bonded to inner sleeve 12 during curing thereof. The axial length of bushing 10 was 2.0 inches and outer metal sleeve 11 had an outer diameter of 1.5 inches.

Performance characteristics were evaluated by comparison with a typical bushing used in automotive applications of the same geometry having an elastomeric insert under radial compression of about 50 percent. The durometer of the rubber compound in typical bushings is about 60. Test results utilizing the typical prior art bushing and two bushings of the present invention are summarized in tabular form below.

|  | Test A | Test B | Typical Bushing |
|---|---|---|---|
| Static Radial Spring Rate lbs./in. | 21,900 | — | 16,000 |
| Static Torsional Spring Rate lb.-in./deg. | 7.5 | 7.3 | 8.5 |
| Dynamic Radial Spring Rate lbs./in. at |  |  |  |
| 10 Hz. | 40,100 | 37,800 |  |
| 20 Hz. | 40,600 | 38,500 | 35,000 |
| 30 Hz. | 40,100 | 34,400 |  |
| Damping Coefficient, lbs.-sec/in. at |  |  |  |
| 10 Hz. | 75.1 | 64.3 |  |
| 20 Hz. | 45.4 | 42.0 | 21.8 |
| 30 Hz. | 31.1 | 29.0 |  |
| Fatigue Life - Kc. | 2400 | 2300 | 350 |
| Loss Factor* for Radial Loading at |  |  |  |
| 10 Hz. | 0.12 | 0.11 |  |
| 20 Hz. | 0.14 | 0.14 | 0.08 |
| 30 Hz. | 0.14 | 0.16 |  |

Radial Load, 1500 Lbs.
Torsional deflection, ± 19 deg.
Test frequency, 250 CPM.
Outer metal Rotation.

*Footnote:
Loss Factor = 6.28 × (Damping Coefficient) × (Frequency)/Dynamic Spring Rate As can be seen from the tests, the static and dynamic properties between the bushing of the present invention and the prior art are similar, except for the damping coefficient and loss factor which are higher in the bushing of the present invention. The fatigue life of the bushing of the present invention is seven times better than the prior art. With respect to the performance characteristics of the bushings of the present invention the loss factor is an important parameter for vibrational mounts. The loss factor is a measure of the ratio of the energy dissipated to the maximum energy stored in the mount per cycle. The loss factor controls the amplitude of vibration of the mounted system when it is excited to resonance and the rate of free decay of system vibrations after shock loadings. The higher the loss factor, the lower the vibration amplitude at resonance (amplification at resonance) and the faster the decay rate. Hence, high loss factors are desired in many applications, particularly automotive applications. The rubber compounds used in the cord/rubber inserts of the present invention have loss factors in the range of 0.06 to 0.08. Using standard test methods, it has been found that these inserts have even lower loss factors. However, as seen in the above table, the convoluted cord/rubber inserts of the present invention provide a significantly higher loss factor (approximately double) than can be achieved with the individual components of the prior art bushings.

Moreover, the radial spring rate can be increased or stiffened by increasing the durometer of the elastomeric material 15 or reducing the material thickness. The torsional stiffness can be increased by orienting the polyester cords, fabric material 14, either in a bias or axial direction. The damping properties can be increased by employing a bias-ply cord/rubber laminate in the bushing. The latter direction giving substantial increases in radial stiffness without providing corresponding increases in the torsional rates.

It was also found that the bushings of the present invention ran at lower temperatures than prior art bushings of similar dimensions during the fatigue tests. Thus, it can be seen that the bushings of the present invention provide numerous advantages over the prior art bushing while at the same time increasing the design parameters available for controlling various spring rates.

While a presently preferred embodiment has been shown and described in particularity, the invention may be otherwise embodied within the scope of the appended claims.

What is claimed is:

1. In a bushing comprising an outer rigid member, an inner rigid member spaced apart from said outer member and an integral elastomeric insert unit mounted in compression and in compressive elongation between said inner member and said outer member, the improvement wherein said insert unit comprises a composite of a convolution of a plurality of overlapping turns of a laminate having an array of flexible fiber cords disposed between layers of elastomer with said cords and said elastomer being bonded together to form said integral insert unit.

2. A bushing as set forth in claim 1 wherein said composite comprises an array of parallel spaced apart cords embedded in an elastomeric matrix to form said laminate.

3. A bushing as set forth in claim 2 wherein said composite is convoluted with the cords aligned with the axis of said members.

4. A bushing as set forth in claim 2 wherein said composite is convoluted with the cords aligned at an angle to the axis of said members.

5. A bushing as set forth in claim 1 wherein said composite comprises a calender layer of elastomer and fabric.

6. A bushing as set forth in claim 1 wherein said members comprise concentrically spaced apart sleeves.

7. A bushing as set forth in claim 2 wherein said composite is convoluted with the cords aligned with the circumference of said members.

8. A bushing as set forth in claim 1 wherein said insert unit is bonded to the surfaces of said members in contact with said insert unit.

9. A bushing as set forth in claim 1 wherein said array of cords comprises more than one ply of cords.

10. A bushing as set forth in claim 1 wherein said elastomer has a durometer of between about 40 and 60 Shore A after calendering.

11. A bushing as set forth in claim 1 wherein said laminate is a polyester-calendered fabric.

12. A bushing as set forth in claim 1 wherein said laminate is of thickness of about 0.030 inches to 0.075 inches.

13. A bushing as set forth in claim 1 wherein said cords are disposed in alignment and spaced apart at about 16 to 35 cords per inch.

14. A bushing as set forth in claim 2 wherein said cords are disposed in alignment and spaced apart at about 16 to 35 cords per inch.

15. A bushing as set forth in claim 14 wherein said laminate is of thickness of about 0.030 inches to 0.075 inches.

16. A bushing as set forth in claim 14 wherein said laminate is a polyester-calendered fabric.

17. A bushing as set forth in claim 2 wherein said elastomer has a durometer of between about 40 and 60 Shore A after calendering.

18. A bushing as set forth in claim 2 wherein said array of cords comprises more than one ply of cords.

19. A bushing as set forth in claim 2 wherein said insert unit is bonded to the surfaces of said members in contact with said insert unit.

20. The method of fabricating a resilient bushing having a rigid outer member and a rigid inner member with an integral elastomeric insert unit compressively restrained between the surfaces of said members which are in contact with said insert unit, the steps comprising:

A. forming a laminate comprising an array of flexible fiber cords disposed between layers of elastomer;
B. winding said laminate into a composite of a convolution of a plurality of overlapping turns;
C. mounting said composite in compression between said inner member and said outer member and causing elongation of said composite along the length of said members to form said bushing; and
D. heat curing said bushing to bond said composite including said elastomer and said cords into an integral elastomeric insert unit.

21. The method of claim 20 wherein the step of heat curing to bond said composite into said integral elastomeric insert unit is performed before said insert unit is mounted between said inner member and said outer member.

22. The method of claim 20 wherein said heat curing of said bushing bonds said insert unit to said surfaces.

23. The method of claim 21 further including the step of heating said bushing to bond said insert unit to said surfaces.

* * * * *